March 7, 1961
S. W. GRINNELL ET AL
2,973,642
SAMPLING APPARATUS AND METHOD
Filed April 24, 1957
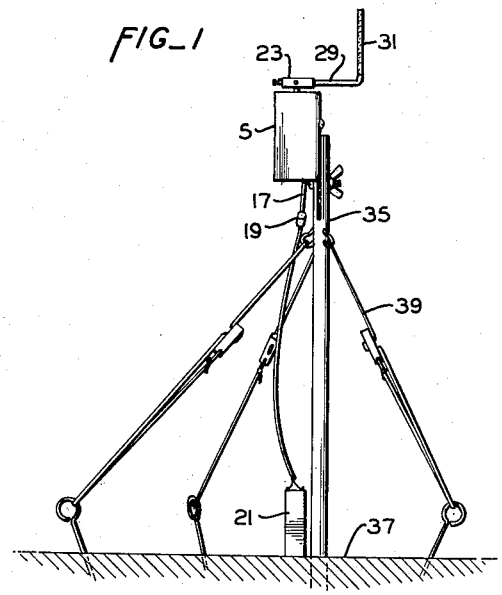
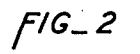
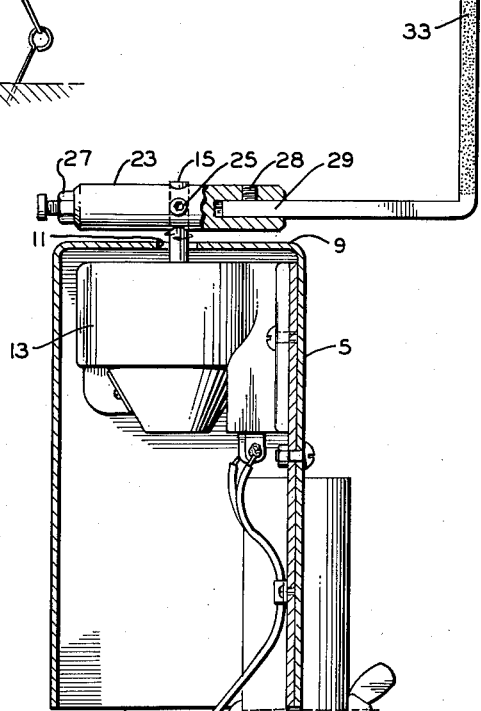
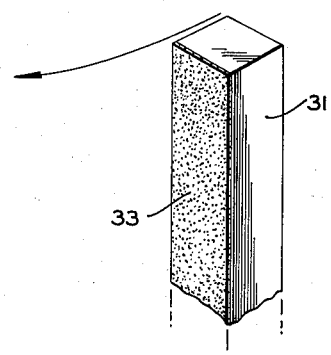
INVENTORS
STUART W. GRINNELL
WILLIAM A. PERKINS
LELAND M. VAUGHAN
ECKHOFF & SLICK
ATTORNEYS
BY
A MEMBER OF THE FIRM

United States Patent Office

2,973,642
Patented Mar. 7, 1961

2,973,642

SAMPLING APPARATUS AND METHOD

Stuart Wood Grinnell, Menlo Park, William A. Perkins, Jr., Los Altos, and Leland M. Vaughan, San Jose, Calif., assignors, by mesne assignments, to Metronics Associates, Inc., Palo Alto, Calif., a corporation of California Filed Apr. 24, 1957, Ser. No. 654,940

6 Claims. (Cl. 73—170)

This invention relates to a sampling device and, more particularly, to a device for sampling small particles of solid or liquid material from air or other gases, or for sampling gases.

Heretofore, sampling devices have ordinarily employed chambers having filters or impact surfaces therein wherein a known volume of air is pumped through the device for sampling. Such devices are relatively expensive, require a considerable amount of power, and are expensive to maintain. Further, such devices are dependent upon wind direction and velocity, particularly when used to collect large particles.

In accordance with the present invention, a sampling device is provided which is inexpensive, has a very low power requirement, and is light and portable. Further, the sampling efficiency is very high, particularly for large particles and is independent of wind velocity. Efficiency is independent of wind velocity in the sense that it does not vary with velocity provided the velocity does not exceed a value for which the sampler was designed. The characteristics of the sampler can be modified to encompass a wide range of maximum wind velocities. This differs substantially from the characteristics of conventional types of samplers in that they are most efficient at a specific wind velocity and become less efficient as the wind speed departs (higher or lower) from the design value. The sampler has a low power requirement and is light and portable and may be operated for long periods of time in a remote area, utilizing only a small power source.

In general, these desirable ends are achieved by providing an impact type sampling device wherein a rod or other sampling member of known area is revolved at a relatively high rate of speed through the air, or other gas to be sampled. It has been found that such a device samples quantitatively with high efficiency particles 20 microns in diameter and larger. Smaller particles, i.e., 1 to 10 microns in diameter, are collected quantitatively but with lower efficiency.

In the drawings forming a part of this application:

Figure 1 is an elevational view of a preferred embodiment of the present invention.

Figure 2 is an enlarged view of the sampling device proper of Figure 1, partly in section.

Figure 3 is a fragmentary perspective view of the collecting surface.

Turning now to a description of the device, a cover member 5 is provided which has an open bottom, generally designated 7, and a top 9, which is completely closed except for a central opening 11. A motor 13 is mounted by suitable means within the hollow cover member 5 and the shaft 15 of the motor extends through the opening 11. The motor 13 is connected by suitable wiring 17 through a plug 19 to a suitable source of electricity, such as a battery 21. Mounted on the shaft of the motor 13 is a hub 23, held in place by means of a set screw 25. One end of the hub 23 is provided with an adjustable counterbalance 27, while the opposite end is hollow to accept a rod 29, which in turn is held in place by means of a set screw 28. The adjustable counterbalance 27 can be replaced by a second rod identical to 29 if greater flow rates are desired. Another set screw similar to 28 is required. The rod 29 terminates in an upwardly turned outer end 31, which is parallel to the motor shaft 15. The rod 31 is preferably of a square cross section, as is shown in detail in Figure 3, and one surface is coated with a pressure sensitive adhesive 33, such as a tacky, rubber-like material for the sampling of particulate material. For sampling gases or vapors, the coating may consist of a suitable sorbent material which will absorb and/or adsorb the desired material.

The sampling device may be conveniently mounted in the field on a split pole 35, which is driven into the ground 37, and provided with suitable guys 39.

In one typical embodiment of the invention, the rod 29 was about 4" long and was bent at right angles near the center so that the horizontal portion of the rod 31 was 2" long and spaced 2" from the shaft 15. The leading face of the 2" vertical section, a portion of which is shown in Figure 3, is the collecting surface. The set screw arrangement 28 permits the rods to be interchanged readily. Since the vertical collecting surface is 2" from the shaft, the velocity in miles per hour of the collecting surface relative to the air is $0.0119 \times$ r.p.m., so that with a motor speed of 1500 r.p.m., the collecting surface velocity of 17.9 miles per hour is achieved in still air. It has been found that a velocity of four miles per hour is sufficient to quantitatively collect 20 micron particles by impaction, so that the sampler can be used effectively at wind speeds up to at least 14 miles per hour when operated at this speed. If higher wind speeds are to be expected during the sampling operation the collector speed can be increased so that the difference between maximum wind speed and collector speed is at least 4 miles per hour, i.e., the collector speed should always be at least 4 m.p.h. greater than the expected maximum wind speed. The total volume of air sampled is readily calculated from the collecting velocity, leading surface area and operating time. The number of particles collected may be determined by examination of the collecting surface under a microscope or, if radio-active, by the use of a suitable counter. Further, the particles may be removed from the rod without loss for subsequent examination or treatment.

Although it has been assumed that the device is to be used for sampling particles in air, it may be used in industrial applications for sampling particles in various gases or vapors.

The collecting surface of the rod may be polished, anodized or blackened to provide maximum contrast for the particular particles being sampled.

It is believed obvious from the foregoing that we have provided an improved sampling device and method which is much more effective than sampling methods heretofore employed.

We claim:

1. A portable impaction sampling device comprising a motor, a shaft extending from said motor, a rod attached to said shaft and driven by said motor in continuous rotation, said rod having a collecting surface adapted to retain collateral material thereon, said collecting surface extending parallel to the axis of said shaft and describing a circular path around said axis.

2. The device of claim 1 wherein said collecting surface has a tacky adhesive thereon.

3. The device of claim 1 wherein the collecting surface is treated to provide visual contrast with particles collected on the collection surface.

4. The device of claim 1 wherein the collecting surface has a sorbent material to collect a gas.

5. The method of sampling particulate matter in a gas by impaction, comprising moving a relatively long, narrow, flat collecting surface in a continuous sweeping path around a fixed axis while maintaining the major axis of the collecting surface parallel to the axis of rotation and said flat surface normal to the path of movement whereby substantially all portions of said flat surface sweep substantially equal paths.

6. The method of sampling particulate matter in a gas by impaction, comprising moving a relatively long, narrow, flat, tacky collecting surface in a continuous sweeping path around a fixed axis while maintaining the major axis of the collecting surface parallel to the axis of rotation and said flat surface normal to the path of movement whereby substantially all portions of said flat surface sweep substantially equal paths.

References Cited in the file of this patent

UNITED STATES PATENTS 1,063,494    Bardill  ---------------- June 3, 1913

FOREIGN PATENTS

659    Great Britain ------------------ 1911

UNITED STATES PATENT OFFICE

CERTIFICATION OF CORRECTION

Patent No. 2,973,642                        March 7, 1961

Stuart Wood Grinnell et al.

It is hereby certified that error appears in the above numbered patent requiring correction and that the said Letters Patent should read as corrected below.

Column 2, line 63, for "collateral" read -- collected --.

Signed and sealed this 25th day of July 1961.

(SEAL)
Attest:

ERNEST W. SWIDER                        DAVID L. LADD
Attesting Officer                         Commissioner of Patents